April 27, 1965   O. R. SHOWALTER, JR   3,180,353
FLUID FLOW CONTROL VALVE
Filed April 1, 1963

ONSLOW R. SHOWALTER, JR.
INVENTOR

Huebner & Worrel
ATTORNEYS

United States Patent Office 3,180,353
Patented Apr. 27, 1965

3,180,353
FLUID FLOW CONTROL VALVE
Onslow R. Showalter, Jr., P.O. Box 1601,
Fresno, Calif.
Filed Apr. 1, 1963, Ser. No. 269,570
8 Claims. (Cl. 137—321)

This invention relates to a fluid flow control valve having a self-flushing control member and more particularly to such a valve presenting a relatively smooth outward configuration and affording a recessed control member.

In certain environments in which fluid flow control valves are installed, a requisite characteristic of such valves is that they present a substantially smooth external surface with a minimum or no external projections, such as control handles and the like. For example, such flow control valves are sometimes installed substantially flush with a supporting surface, such as the floor of a building. A particular environment in which the valve of the present invention has great utility is an irrigation water flow control valve installed in a grazing area in which livestock, such as horses or cattle, are permitted to roam. With previously available valves which employed projecting control members in such environments, livestock grazing in the area were frequently injured by stepping or tripping on the protruding control members of such valves and, of course, the valves were frequently displaced from adjustment and damaged.

In an attempt to obviate such a shortcoming of previously available valves, certain structures have been designed to incorporate a recessed control member. However, such valves have not been satisfactory in that the recesses which receive the control members normally become clogged with earth and other foreign matter, thereby rendering the control member inaccessible.

Accordingly, it is an object of the present invention to provide an improved fluid flow control valve having a control member which is automatically cleaned during operation of the valve.

Another object is to provide a dependable valve adapted for use in irrigation systems in grazing areas for livestock.

Another object of the invention is to provide a fluid flow control valve adapted to be mounted substantially flush relative to the surface of support in which it is mounted.

Another object is to provide a dependable flow control valve ideally suited for use in irrigation systems installed in grazing areas.

A further object is to provide an irrigation flow control valve constructed of a minimum number of parts and which is reliable in service.

These, together with other objects, will become more fully apparent upon reference to the following description and accompanying drawing.

Figure 1:
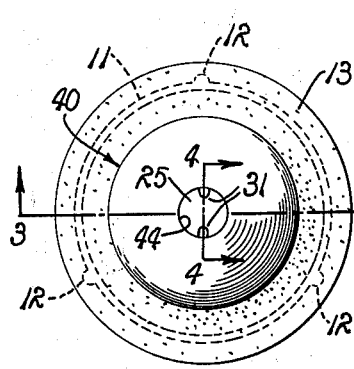
FIG. 1 is a top plan view of a fluid flow control valve embodying the principles of the present invention.
Figure 2:
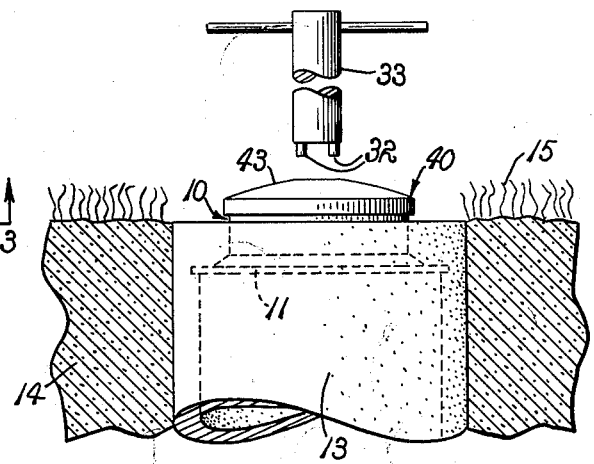
FIG. 2 is a view in side elevation showing the valve of FIG. 1 installed in a portion of an irrigation system vertically disposed in the earth.

Referring more particularly to the drawings, the valve of the present invention comprises an annular housing 10 which serves as a valve body. The housing 10 is provided with a peripheral mounting flange 11 from which integral anchoring lugs 12 are radially extended at circumferentially spaced locations. The mounting flange 11 in conjunction with the lugs 12 adapt the valve body for concentric mounting in an upper end of a conventional concrete standpipe 13, commonly employed in low pressure irrigation systems. The pipe 13 is supported in the earth 14 with its upper end substantially flush with the surface thereof, as shown in FIG. 2. In some environments for which the valve of the present invention is ideally suited, the surface of the supporting earth is covered with vegetation, indicated at 15, as in the case of grazing land. It will be noted that the annular housing 10 defines a discharge opening 16 substantially circular in plan. The discharge opening 16 is circumscribed by an annular valve seat 17.

The housing 10 includes a boss 20 supported substantially centrally of the discharge opening 16 by a plurality of radially extended struts 21 integrally interconnecting the housing and the boss. The central boss 20 is provided with an axially extended threaded bore 22 substantially concentric with the discharge opening 16.

A control member, indicated generally at 25, includes an elongated rod 26 screw-threadably connected to the boss 20 by means of the threaded bore 22. The control member 25 includes a shank portion 27 interjacent an inboard stop nut 28 and an outboard stop shoulder 29. The stop nut 28 is preferably staked to the threaded rod 26 at a predetermined axial station, thereby locating the nut 28 from the stop shoulder 29 at a predetermined axial spacing. A socket member 30 is integrally joined to the shank portion 27 and is provided with a pair of diametrically opposed notches 31. The notches 31 are adapted to receive the axially projecting prongs 32 of an operating tool, fragmentarily illustrated at 33.

A cover plate generally indicated at 40 is substantially circular in plan and is provided with a downwardly presented annular groove 41 in which is received an annular seal member 42, formed of a suitable resilient elastomeric material, such as rubber or the like. The cover plate is provided with an external surface 43 of substantially smooth configuration except for a central recess 44. The recess 44 is dimensioned to receive the socket member 30, so that the external configuration of the cover plate 40 does not provide any projections. A central aperture 45 is also provided in the cover plate centrally of the recess 44, and is adapted to receive the shank portion 27 loosely therein to provide a slight radial clearance between the cover plate and the shank portion. The radial clearance is of a sufficient magnitude to permit rotation of the shank portion 27 in the aperture 45 without substantial contact between the adjacent respective peripheral surfaces afforded by such a construction, and also to permit fluid flow around the shank portion. To admit fluid to the shank portion, the cover plate 40 is provided with an inwardly presented shoulder 46 in which a plurality of radial grooves 47 are formed in fluid communication with the central aperture 45. A shoulder 46 is adapted to engage the stop nut 28 upon movement of the control member 25 upwardly, as viewed in FIG. 2. A seal washer 48 is carried on the shank portion 27 in circumscribing relationship and disposed between the stop shoulder 29 and an upwardly presented shoulder 49 of the plate 40.

*Operation*

Figure 3:
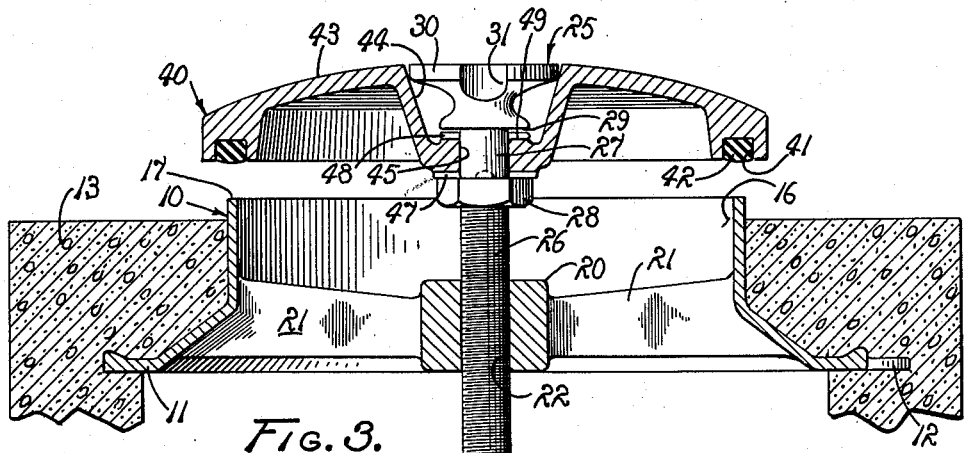
FIG. 3 is an enlarged view in vertical, transverse section, taken on line 3—3 of FIG. 1.

The operation of the described embodiment of the subject invention is believed to be readily apparent and is briefly summarized at this point. To move the valve of the present invention to a closed position, the prongs 32 of the operating tool 33 are inserted within the mating notches 31 of the socket member 30 and rotated in an appropriate direction to effect axial movement of the control member 25 downwardly, as viewed in FIG. 2. Accordingly, the stop shoulder 29 urges the cover 40 from the open position, as shown in FIG. 3, to a closed position, as shown in FIG. 2. In the closed position, the seal member 42 is urged into sealing relationship with the valve seat 17 by the cover plate 40 under the influence of the shoulder 29 of the control member 25 urging the seal washer 48 against the upwardly presented shoulder 49 of the cover. Consequently, with the valve cover in a closed position, fluid flow is blocked through the discharge opening 16 as well as through the radial flushing grooves 47 and the aperture 45.

Figure 4:
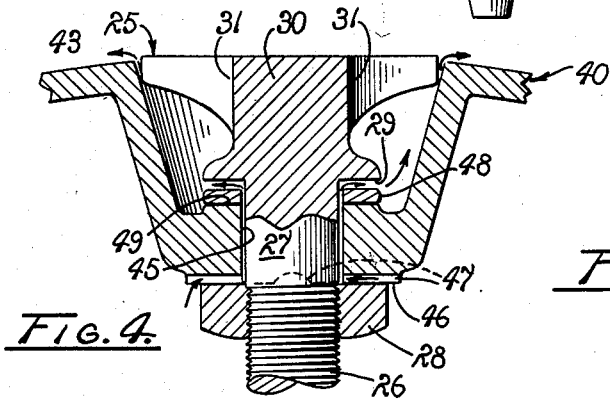
FIG. 4 is an enlarged, fragmentary view in vertical, transverse section, taken on line 4—4 of FIG. 1.
Figure 5:
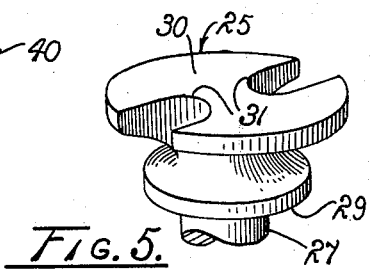
FIG. 5 is a fragmentary perspective view of the control member employed in the valve of FIG. 1.

When it is desired to open the valve, as during periods of irrigation, the operating tool is rotated in an appropriate direction to effect upward movement of the control member 25, as viewed in FIG. 3. Upon such movement, the stop nut 28 contacts the inwardly presented shoulder 46. Since the axial spacing of the inboard and outboard shoulders 28 and 29 is greater than the thickness of the cover plate surrounding the aperture 45, the seal washer 48 is no longer effective to prevent fluid flow from the shank portion 27. Consequently, fluid within the valve housing 10 is permitted to escape at a controlled flow rate through the radial grooves 47, around the shank portion 27 through the aperture 45 in cleansing contact with the socket member 30. Such a flow path of the controlled fluid flow is indicated by the arrows in FIG. 4. The result of such controlled fluid flow is to flush any earth, sediment or other foreign matter which may have become lodged in the recess 44 or the notches 31.

Accordingly, the socket member 30 is at all times available to the operating tool 33, while providing a valve construction which is free from any projections. Regardless of the degree of opening of the valve effected by raising the cover plate 40, as viewed in FIG. 3, a controlled flow of the fluid in the valve is available to escape around the socket member 30 in cleansing contact therewith.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a valve having a valve seat, a valve plate; means interconnecting the seat and the plate for relative movement of the plate between open and closed positions, said plate having a substantially smooth external surface, an operating tool receiving opening, and a fluid passage therethrough communicating with said opening; and means in said passage operable in response to movement of the plate between open and closed positions correspondingly to open and to close the passage.

2. In a valve having a housing provided with a fluid discharge opening therein and a flow control element adapted to be moved to and from open and closed positions and mounted in the housing relative to the opening to admit and to block fluid flow therethrough when in a respective one of said positions, a control member mounted in the housing and adapted to move said flow control element to and from said open and closed positions, the control member having a portion disposed externally of the housing, and means connecting the control member to said flow control element in control relationship, including means to permit fluid flow in cleansing contact with said external portion upon movement of said control element toward said open position.

3. A valve comprising a valve body provided with a discharge opening for fluid flow therethrough; a valve seat carried by the body in circumscribing relationship to said opening; flow control means movable between open and closed positions and adapted to engage said seat when in said closed position thereby blocking said opening; a control member mounted in the body for selective movement to and from open and closed positions including a portion disposed externally of the body; and means connecting the control member to said flow control means in control relationship including means to direct fluid flow in cleansing contact with said external portion upon movement of said flow control means toward an open position.

4. A valve comprising a housing having a discharge opening therein and affording an annular valve seat circumscribing the opening; a boss; strut means interconnecting the boss with the housing and supporting the boss adjacent to the opening; a cover plate adapted to close said opening and having an aperture therethrough; an elongated control member screw-threadably connected to the boss to permit selective reciprocal movement of the member and having a shank portion loosely received in said aperture and permitting fluid flow therethrough and a socket member disposed externally of said plate; and stop means carried on said control member on opposite sides of said plate to urge the plate to and from open and closed positions upon appropriate axial movement of said control member, said stop means being axially spaced at a distance greater than the thickness of that portion of the cover plate surrounding said aperture to permit fluid flow past the control member through the aperture and in cleansing contact with the socket member upon axial movement of the control member toward an open position.

5. A valve comprising a housing having a discharge opening therein and affording an annular valve seat circumscribing the opening; a boss; strut means interconnecting the boss with the housing and supporting the boss adjacent to the opening; a cover plate adapted to close said opening and having an aperture therethrough; an elongated control member screw-threadably connected to the boss to permit selective reciprocal movement of the member and having a shank portion loosely received in said aperture and permitting fluid flow therethrough and a socket member disposed externally of said plate; inboard and outboard stop means carried on said control member on opposite sides of said plate to urge the plate to and from open and closed positions upon appropriate axial movement of said control member, said stop means being axially spaced at a distance greater than the thickness of that portion of the cover plate surrounding said aperture to permit fluid flow past the control member through the aperture and in cleansing contact with the socket member upon axial movement of the control member toward an open position; and seal means circumscribing said control member and disposed adjacent to said outboard stop means and adapted to engage said cover plate in a sealing relationship upon movement of the control member to a closed position.

6. A valve comprising a housing having a discharge opening therein and affording an annular valve seat circumscribing the opening; a boss; strut means interconnecting the boss with the housing and supporting the boss adjacent to the opening; a cover plate adapted to close said opening and having an aperture therethrough and an outwardly facing recess surrounding the aperture; an elongated control member screw-threadably connected to the boss to permit selective reciprocal movement of the member and having a shank portion extended axially through said aperture in loose fitting relationship to permit fluid flow therethrough and a socket member disposed externally of said plate and received within said recess; inboard and outboard stop means carried on said control member on opposite sides of said plate to urge the plate to and from open and closed positions upon appropriate axial movement of said control member, said stop means being axially spaced at a distance greater than the thickness of that portion of the cover plate surrounding said aperture to permit fluid flow past the control member through the aperture and in cleansing contact with the socket member upon axial movement of the control member toward an open position; and seal means circumscribing said control member and disposed adjacent to said outboard stop means and adapted to engage said cover plate in a sealing relationship upon movement of the control member to a closed position.

7. A valve comprising an annular housing defining a fluid discharge opening and providing an annular valve seat circumscribing the opening; a boss disposed substantially centrally of the opening and having a threaded bore substantially concentric therewith; a plurality of struts radially extended from the boss and joined integrally with the housing; a circular cover plate having a central aperture therethrough and an externally present recess circumscribing the aperture and affording a substantially smooth external configuration except for the recess; an annular seal carried by the cover plate and adapted to engage the valve seat in sealing relationship when the plate is in closing relationship to the discharge opening; an elongated control rod screw-threadably connected with the boss and adapted for reciprocal axial movement upon appropriate rotation of the rod, the rod being extended axially through the cover plate aperture in loose fitting relationship to permit fluid flow therethrough; an inboard stop member rigidly secured to the control rod and adapted to engage and to move the cover plate to an open position upon rotation of the control rod in one direction; an outboard stop member carried by the control rod and spaced from the inboard stop member an axial distance greater than the thickness of that portion of the cover plate surrounding the aperture therein, the outboard stop member adapted to engage and to move the cover plate to a closed position upon rotation of the control rod in an opposite direction; and an external socket member rigidly secured to the control rod and substantially filling the cover plate recess and in fluid communication with the discharge opening when the cover plate is moved toward an open position thereby permitting cleansing contact with the socket member by fluid flowing through the valve.

8. A valve comprising an annular housing defining a fluid discharge opening and providing an annular valve seat circumscribing the opening; a boss disposed substantially centrally of the opening and having a threaded bore substantially concentric therewith; a plurality of struts radially extended from the boss and joined integrally with the housing; a circular cover plate having a central aperture therethrough and an externally presented recess circumscribing the aperture and affording a substantially smooth external configuration except for the recess, the plate having an internally presented shoulder provided with a plurality of radial grooves therein; an annular seal carried by the cover plate and adapted to engage the valve seat in sealing relationship when the plate is in closing relationship to the discharge opening; an elongated control rod screw-threadably connected with the boss and adapted for reciprocal axial movement upon appropriate rotation of the rod, the rod being extended axially through the cover plate aperture in loose fitting relationship to permit fluid flow therethrough; an inboard stop member rigidly secured to the control rod and adapted to engage and to move the cover plate to an open position upon rotation of the control rod in one direction; an outboard stop member carried by the control rod and spaced from the inboard stop member an axial distance greater than the thickness of that portion of the cover plate surrounding the aperture therein, the outboard stop member adapted to engage and to move the cover plate to a closed position upon rotation of the control rod in an opposite direction; a seal member circumscribing the control rod and adapted to be urged into sealing relationship with the cover plate by the outboard stop member upon rotation of the rod in said opposite direction; and an external socket member rigidly secured to the control rod and substantially filling the cover plate recess and in fluid communication with the discharge opening when the cover plate is moved toward an open position thereby permitting cleansing contact with the socket member by fluid flowing through the valve.

References Cited by the Examiner
UNITED STATES PATENTS

| 1,455,406 | 5/23 | Nicolaides | 137—321 |
| 2,051,919 | 8/36 | Tow | 137—321 |

M. CARY NELSON, *Primary Examiner*.